(12) United States Patent
Reme (10) Patent No.: US 8,488,887 B2
(45) Date of Patent: Jul. 16, 2013

(54) METHOD OF DETERMINING AN IMAGE DISTRIBUTION FOR A LIGHT FIELD DATA STRUCTURE

(75) Inventor: Jean-Marc Reme, Montigny le Bretonneux (FR)

(73) Assignee: Entropic Communications, Inc., San Diego, CA (US)

( * ) Notice: Subject to any disclaimer, the term of this patent is extended or adjusted under 35 U.S.C. 154(b) by 399 days.

(21) Appl. No.: 12/599,048

(22) PCT Filed: May 14, 2008

(86) PCT No.: PCT/IB2008/051897
§ 371 (c)(1),
(2), (4) Date: Nov. 6, 2009

(87) PCT Pub. No.: WO2008/146190
PCT Pub. Date: Dec. 4, 2008

(65) Prior Publication Data
US 2010/0232499 A1 Sep. 16, 2010

(30) Foreign Application Priority Data

May 30, 2007 (EP) .................................. 07290677

(51) Int. Cl.
*H04N 7/12* (2006.01)
(52) U.S. Cl.
USPC ...................................... 382/224; 375/240.12
(58) Field of Classification Search
USPC ...................................... 375/240.12; 382/224
See application file for complete search history.

(56) References Cited

U.S. PATENT DOCUMENTS 5,623,308 A * 4/1997 Civanlar et al. .......... 375/240.01
6,097,394 A 8/2000 Levoy et al.
(Continued)

FOREIGN PATENT DOCUMENTS

WO WO 2005096631 A1 * 10/2005

OTHER PUBLICATIONS

Magnor, Marcus; "Data Compression for Light-Field Rendering". IEEE vol. 10. No. 3 Apr. 2000 pp. 338-343.*
(Continued)

*Primary Examiner* — Sath V Perungavoor
*Assistant Examiner* — Jeffery Williams
(74) *Attorney, Agent, or Firm* — Bruce Greenhaus; Richard Bachand; Duane Morris LLP (57) ABSTRACT

The invention relates to a method of determining an image distribution ($D_{opt}$) for a light field data structure, which method comprises obtaining a plurality of images ($F_1, F_2, \ldots, F_n$) from a plurality of image sources ($C_1, C_2, \ldots, C_n$), performing image analysis on each image ($F_1, F_2, \ldots, F_n$) of the plurality of images ($F_1, F_2, \ldots, F_n$) to determine whether a specified criterion is satisfied by the content of that image ($F_1, F_2, \ldots, F_n$), and identifying a group (12) of images ($F_1, F_2, \ldots, F_n$) whose contents satisfy the specified criterion. The image group (12) is compared to each reference image distribution ($D_1, D_2, \ldots, D_m$) of a set of predefined reference image distributions ($D_1, D_2, \ldots, D_m$) to select an optimal image distribution ($D_{opt}$), wherein a reference image distribution ($D_1, D_2, \ldots, D_m$) comprises a predefined arrangement of I-images and P-images of the light field data structure. Each image ($F_1, F_2, \ldots, F_n$) of the plurality of images ($F_1, F_2, \ldots, F_n$) of the light field data structure is subsequently designated to be either an I-image or a P-image according to the selected image distribution ($D_{opt}$). The invention also describes a system (1) for determining an image distribution ($D_{opt}$) for a light field data structure.

10 Claims, 7 Drawing Sheets

U.S. PATENT DOCUMENTS

| | | | |
|---|---|---|---|
| 6,476,805 | B1 | 11/2002 | Shum et al. |
| 6,693,964 | B1 | 2/2004 | Zhang et al. |
| 2003/0023974 | A1* | 1/2003 | Dagtas et al. .................. 725/47 |
| 2004/0114807 | A1 | 6/2004 | Lelescu et al. |
| 2004/0222989 | A1 | 11/2004 | Zhang et al. |
| 2005/0219264 | A1 | 10/2005 | Shum et al. |
| 2007/0140352 | A1* | 6/2007 | Bhaskaran et al. ...... 375/240.24 |

OTHER PUBLICATIONS

Levoy, Marc, et al; "Light Field Rendering"; SIGGRAPH; May 1996; pp. 31-42.

Magnor, Marcus, et al; "Data Compression for Light-Field Rendering"; IEEE Transactions on Circuits and Systems for Video Technology; vol. 10, No. 3; IEEE Service Center, Piscataway, NJ, US; Apr. 2000; pp. 338-343.

Dasgupta, et al; "Pattern Tracking and 3-D Motion Reconstruction of a Rigid Body From a 2-D Image Sequence"; IEEE Transactions on Systems, Man, and Cybernetics—Part C: Applications and Reviews, vol. 35, No. 1; Feb. 2005.

Shum, Heung-Yeung, et al; "Survey of Image-Based Representations and Compression Techniques"; IEEE Transactions on Circuits and Sytems for Video Technology; vol. 13, No. 11; pp. 1020-1037; Nov. 2003.

International Search Report for Application No. PCT/IB2008/051897 (Feb. 16, 2009).

\* cited by examiner

METHOD OF DETERMINING AN IMAGE DISTRIBUTION FOR A LIGHT FIELD DATA STRUCTURE

FIELD OF THE INVENTION

The invention relates to a method of determining an image distribution for a light field data structure. The invention further relates to a system for determining a image distribution for a light field data structure.

BACKGROUND OF THE INVENTION

Light-field rendering has gained in importance in recent years with continuing advances in the field of image processing and computer graphics. With light field rendering, photo-realistic views of scenes can be created using previously digitised images, whether these images have been artificially created or are images of actual scenes, captured by a camera. For instance, a light field can be generated from a three-dimensional model of a scene, or can be created using images of an actual scene, for example, images taken by an arrangement of cameras positioned about the scene. All the images of a scene, taken at a single instant, are collectively referred to as a 'light-field data structure'. A description of light field rendering is given by the paper "Light Field Rendering" (SIGGRAPH May 1996, Marc Levoy and Pat Hanrahan). Some well-known movies successfully combine traditional camera recording with computer-aided light-field rendering to generate complex but realistic special effects.

Figure 1:
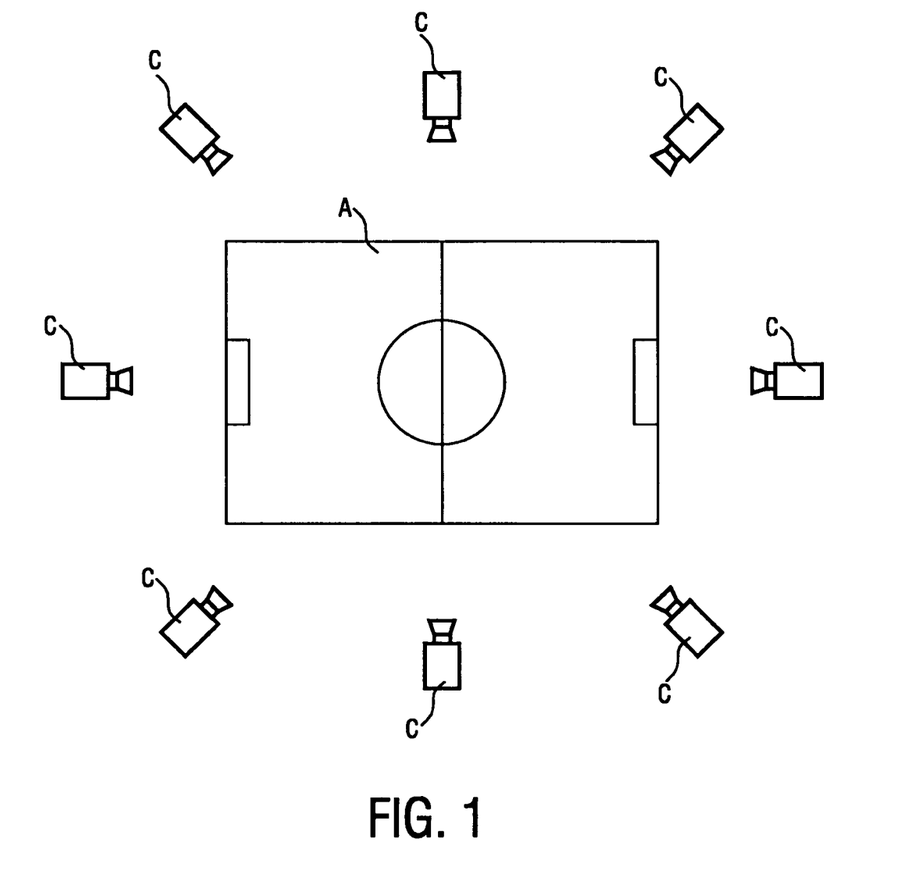
FIG. 1 shows a schematic representation of an arrangement of cameras.

Light fields can be captured photographically using, for example, a hand-held camera, a remote-controlled camera, or an array of cameras mounted on a structure such as a gantry. FIG. 1 shows such an arrangement of cameras C, where the cameras are grouped to surround an area A of interest. For the sake of clarity, only a few cameras are shown. In reality, images must be generated from quite a large number of cameras, or viewpoints, for photo-realistic three-dimensional rendering of a scene. This leads to the problem of storage or transmission for the large number of images, since storage space and transmission bandwidth are expensive resources.

To store or transmit the images in a cost-effective way, the images can be compressed using some method of lossy data compression, which results in a loss of image quality that is, however, not noticeable to the viewer. An image compressed or coded using a lossy data compression algorithm can be represented using fewer bits. Several such lossy compression techniques are known. For example, the most common method used for lossy image compression is transform coding, in which a Fourier-related transform such as the Discrete Cosine Transform (DCT) is applied to the image data. One common standard for image (and audio) compression is the MPEG-2 (Motion Pictures Expert Group)

Figure 2A:
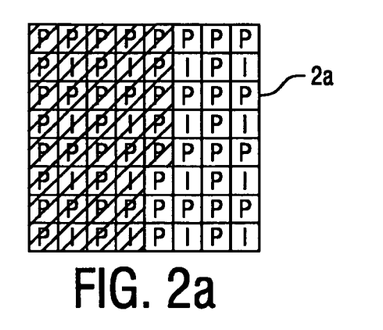
FIG. 2a shows a schematic representation of a first compression scheme.
Figure 2B:
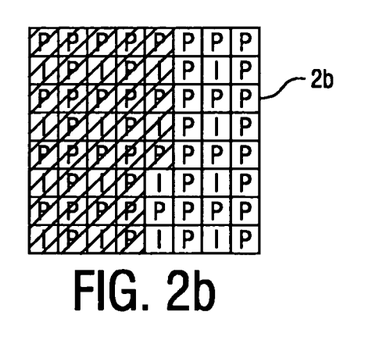
FIG. 2b shows a schematic representation of a second compression scheme.

An image or frame that is compressed in its entirety, i.e. without using information obtained from other images, is often referred to as an 'intra-coded image', 'intraimage', 'I-image', or 'I-frame'. Since the entire image or frame is compressed, this can be rendered again to a fairly high level of quality. However, even more bandwidth can be saved by making use of the fact that picture data in a sequence of images is often redundant. For example, a part of each frame, such as the sky, can remain the same over a sequence of frames. Evidently, this part of each image in the image sequence need only be coded once, and only those parts of an image that have changed with respect to a reference image need be coded. This type of compression is known as 'interframe compression' or 'predictive coding', and an image compressed in this way is referred to as an 'interimage', 'P-image' or 'P-frame'. A P-image can be coded using a previous image (an I-image or a P-image) captured by the same camera. It has been shown that a good picture quality (from the viewer's point of view) can be obtained by using a compression scheme for a light-field data structure based on a trade-off between high-quality (I-images) and low cost (P-images), in which some of the images are compressed as I-images and the remainder are compressed as P-images. In order to obtain a certain level of quality in rendering, however, the I-images should be evenly distributed over the light-field data structure, which can be understood to be a virtual arrangement of the images. FIG. 2a shows an example of such a compression scheme. Here, every second image in every second row of the light-field data structure is an I-image, as indicted by the letter "I", and the remainder of the images are coded as P-images, as indicated by the letter "P". FIG. 2b shows another possible compression scheme. A technique for data compression using I-images and P-images is described in the paper "Data Compression for Light-Field Rendering" (Marcus Magnor and Bernd Girod, IEEE Transactions on Circuits and Systems for Video Technology, Vol. 10, No. 3, April 2000).

In some image rendering applications, for example an interactive 3-D video application, it may be that some object or item is considered to be of particular importance, for example the football in a football match. Usually, the viewer's attention would be focused on the ball. In a 3-D interactive video application rendered using images captured as described above, the user would likely want to have the scenes rendered so that this "important object" is the centre of attention. However, state-of-the-art techniques of light-field data compression do not adapt to such considerations. Using the known techniques, a certain compression scheme is chosen, for example the scheme shown in FIG. 2a, and all the light-field data structures are coded using this scheme, regardless of which images would in fact be most suited for intraimage or interimage compression. Therefore, an 'unfavourable' compression scheme, in which the important object is not coded using a sufficient number of I-images, might lead to a noticeable deficiency in the quality of the rendered scenes.

OBJECT AND SUMMARY OF THE INVENTION

Therefore, it is an object of the invention to provide an improved way of performing video image data compression.

To this end, the present invention provides a method of determining an image distribution for a light field data structure, which method comprises obtaining a plurality of images from a plurality of image sources, performing image analysis on each image of the plurality of images to determine whether a specified criterion is satisfied by the content of that image, and determining a group of images whose content satisfies the specified criterion. This image group is then compared to each reference image distribution of a set of predefined reference image distributions, wherein a reference image distribution comprises a predefined arrangement of I-images and P-images of the light field data structure, to select an optimal image distribution. Each image of the plurality of images of the light field data structure is then designated to be either an I-image or a P-image according to the selected image distribution.

The image sources used to obtain the plurality of images can be an array of cameras, arranged about a target scene. The number of cameras determines the dimensions of the light-field data structure. For example, a total of sixty-four cameras can capture sixty-four images at any instant, and these can be virtually arranged in an 8×8 array or light-field data structure for that instant. The cameras can be mounted on one or more gantries, or can be attached to a support. It is also possible for some or all of the cameras to be moveable, for example being handheld or remote controlled.

An obvious advantage of the method according to the invention is that a high level of quality for a future interactive application can be obtained with relatively little computational effort and without any additional storage or transmission requirements. With the method according to the invention, as many images as possible containing a "relevant object" are coded to a high level of quality for each of a sequence of light-field data structures that are used at a later stage in rendering three-dimensional scenes. There can be any number of predefined reference image distributions available to which the image-related array can be compared. In each comparison, the most suitable reference image distribution is chosen, so that, for each light-field data structure, as many images as possible containing the relevant object are coded as high-quality intraimages, or I-images.

An appropriate system for determining an image distribution for a light field data structure comprises a plurality of image sources for obtaining a plurality of images, and an image analysis module for performing image analysis on each image of the plurality of images to determine whether a specified criterion is satisfied by the content of that image. The system further comprises an image group identification module for identifying a group of images whose contents satisfy the specified criterion, and also a comparison module for comparing the image group to each reference image distribution of a set of predefined reference image distributions to select an optimal reference image distribution, wherein a reference image distribution comprises a predefined arrangement of I-images and P-images of the light field data structure, and an image designation module for designating each image of the plurality of images of the light field data structure to be either an I-image or a P-image on the basis of the selected image distribution.

The dependent claims and the subsequent description disclose particularly advantageous embodiments and features of the invention.

Since the method according to the invention is concerned with optimising the quality of a rendered scene from one or more different viewpoints focused on an important object or object of relevance, the specified criterion preferably comprises descriptive parameters related to an object that can appear in the image, i.e. as part of the content of the image. In the example already given, the relevant object might be the ball in a football game or any other such type of ball game. Another example of an object of relevance might be the lead cyclist in a cycle race or the singer on stage in a concert. The 'object of interest', often referred to as a 'region of interest' or ROI for short, can be identified in an initial image using known techniques and a graphical user interface. For example, a camera operator at a football match can identify the football in one of the initial images captured by one of the cameras as recording commences, or he might use existing video footage to identify the ball. He can then specify the criterion in a suitable manner, for example by a command such as "image must contain this object". Subsequently, the graphical user interface can generate descriptive parameters for this criterion and forward these parameters to all image analysis units of all cameras. Since each image for each light-field data structure must be analysed, it is advantageous for each camera to be equipped with an image analysis unit for performing the necessary image analysis steps.

Alternatively, the important object can be filmed by a dedicated camera, where this dedicated camera continually tracks the object during filming. The dedicated camera can be one of the array of cameras, or can be an additional camera. The object that is located in the centre of this camera's field of vision can be defined to be the relevant object. Therefore, if the camera stops tracking the object, for instance the football, and commences tracking another object, for instance the referee or another player, this change can be noted by image processing software. Suitable parameters describing the current relevant object in the image content can then be generated and forwarded to the other cameras.

In the method according to the invention, the images captured thereafter by the cameras are analysed to determine whether their contents satisfy the specified criterion. Generally, it is easiest to determine whether an image contains relevant object or region of interest by subjecting the image to a process known as segmentation. Therefore, the step of performing image analysis on an image preferably comprises running a segmentation algorithm on that image. Such image processing techniques for determining whether a relevant object is visible in an image, i.e. whether a specified criterion is satisfied or not, will be known to a person skilled in the art, and need not be discussed in detail here. An example of such an approach to image analysis is laid out in the paper "Pattern Tracking and 3-D Motion Reconstruction of a Rigid Body From a 2-D Image Sequence" (Dasgupta and Banerjee, IEEE Transactions on Systems, Man, and Cybernetics—Part C: Applications and Reviews, Vol. 35, No. 1, February 2005).

The results of the image processing yield a group of images whose contents satisfy the specified criterion (e.g. images show the ball), while the contents of the remaining images do not satisfy the specified criterion (e.g. images do not show the ball). Since it is known which image originated from which camera, this image group can preferably be compiled as an image-related array based, for example, on the presence or absence of the object of interest in the images. This image-related array can be a simple one-dimensional array, for example comprising a series of binary values, and overwritten or updated for each new light-field data structure. Each bit of the image-related array can be associated with a particular camera. For example, the twelfth bit in the array can be set to "1" if the image from the twelfth camera for the current light-field data structure contains the object of interest, or can be set to "0" if the object of interest is not visible in that image.

Once the image group or image-related array has been compiled for the current set of images, this can be compared to all available reference image distributions in order to select the most suitable distribution. A reference image distribution has been shown with a graphical representation in FIG. 2a. In reality, an image distribution might simply comprise another one-dimensional array, with a sequence of bits each associated with a video coder. The image distribution for sixty-four images visualised in FIG. 2a might therefore actually take the following form, where the vector or array has 64 entries:

$$D_1=\{P,P,P,P,P,P,P,P,I,P,I,P,I,P,I,P,P,P, \ldots, P,P\}$$

It follows that a comparison between the image-related array and a reference image distribution is reduced to a simple one-to-one comparison of the relevant vectors. The comparison resulting in the most matches (i.e. the most "1" and "I" pairs) can then result in selecting that reference image distribution for the current light-field data structure. Therefore, in a particularly preferred embodiment of the invention, the optimal image distribution corresponds to the reference image distribution which provides the greatest number of I-images for the image group. Obviously, if two or more reference image distributions yield the highest number of matches, any one of these reference image distributions can be chosen to be the optimal image distribution. Which of theses reference image distributions to use may then be chosen using a further criterion, for example to simply use the previous reference image distribution if this is one of the reference image distributions identified by the comparison.

In the method according to the invention, the images for the current light-field data structure are then designated to be coded as either intraframes (I-images) or interframes (P-images). In a particularly advantageous approach, the vector representing the optimal image distribution can be simply translated to a vector giving the image type designations for each image. Again, a simple "1" or "0" can suffice to designate an image as an intraframe or interframe image. For example, a "1" can mean "code this image as an intraframe image", and a "0" can mean "code this image as an interframe image". Therefore, in this advantageous approach, each "I" entry of the selected image distribution need simply be converted to "1", and each "P" entry need simply be converted to "0" to provide each image with its image designation for the current light-field data structure.

To perform video coding of a light field data structure using the method according to the invention, each designated I-image is coded using a compression algorithm, for example a discrete cosine transform (DCT) compression algorithm or a wavelet compression algorithm, and each P-image is coded using one or more previously coded P-images or I-images. Each frame or image is coded by a video coder that can perform either intraframe or interframe coding, as required. The image designator accompanying the image is preferably used to decide which coder to apply. The choice of compression algorithm, as will be known to a person skilled in the art, may be dictated by standards, for example MPEG-2, or may be chosen freely, depending on the application.

The steps of the method described above can be carried out by appropriate digital hardware and software modules. For example, compiling the image group and generating the image type designators for the images of a light-field data structure can be carried out using appropriate software routines or modules, which can be directly loaded into the memory of a programmable device, such as a processor, for use in a system for determining an image distribution for a light-field data structure. Alternatively, these functions could be carried out by dedicated hardware such as a Field-Programmable Gate Array (FPGA) or Application-Specific Integrated Circuit (ASIC).

Other objects and features of the present invention will become apparent from the following detailed descriptions considered in conjunction with the accompanying drawings. It is to be understood, however, that the drawings are designed solely for the purposes of illustration and not as a definition of the limits of the invention.

DESCRIPTION OF EMBODIMENTS

In the diagrams, like numbers refer to like objects throughout. Objects in the diagrams are not necessarily drawn to scale.

FIG. 1 shows, in a schematic representation, one type of camera arrangement for the purpose of collecting or capturing images for a three-dimensional video application. Here, the cameras are arranged about a scene. As already mentioned in the introduction, only a few cameras are shown here. In reality, a much greater number of cameras would be implemented to collect images for obtaining light-field data structures. Images captured by the cameras are combined as described above to give a sequence of light-field data structures which can be used at a later point in time to render the scene from different points of view.

Images are ideally captured by the cameras in a synchronised manner. For example, sixty-four images captured at a single instant by an arrangement of sixty-four cameras can be arranged virtually as an 8×8 array. After compression of the images, the image data contained in this array is referred to as the light-field data structure. As described above, storage space and/or transmission bandwidth for the light-field data structure can be reduced by compressing only some of the images as I-images, and the remainder as P-images. The images are compressed or coded according to a compression scheme. FIG. 2a and FIG. 2b show example compression schemes 2a, 2b. As explained above, the quality of the rendered scene requires that the I-images are evenly distributed over the light-field data structure, and that a certain number of the images are coded as I-images. In the two compression schemes 2a, 2b shown, the I-images are evenly distributed, and sixteen of the sixty-four images are coded as I-images. This 8×8 array is only exemplary, and it will be understood that any number of cameras could be used, yielding a larger or smaller array, as appropriate.

Figure 3:
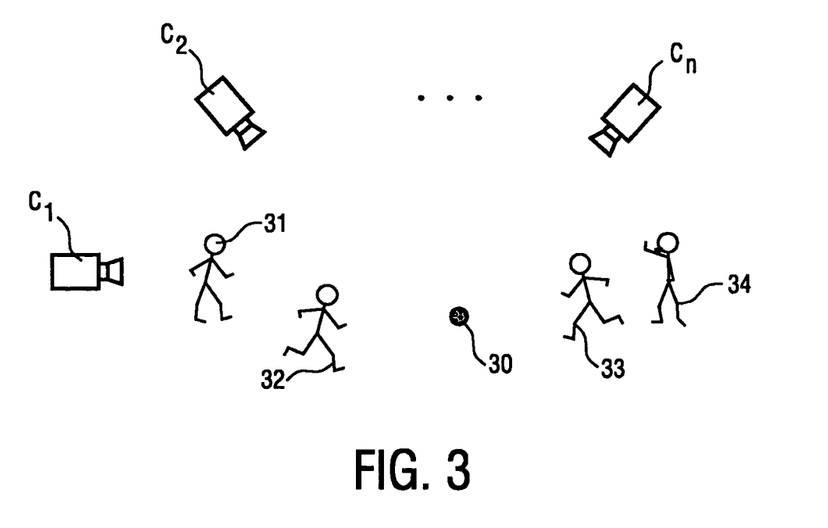
FIG. 3 shows a schematic representation of a scene containing an object of relevance.

The invention is concerned with ensuring that 3D scenes in an interactive video application are rendered to a high level of quality. In the method according to the invention, a criterion is specified, and a compression scheme is selected that best suits the number of images whose contents satisfy the specified criterion. This is explained with the aid of FIG. 3, which shows a scene in which football is being played. The game is being recorded using cameras $C_1, C_2, \ldots, C_n$ of a camera arrangement placed around the football pitch. A football 30 is being kicked about the pitch by a number of players 31, 32, 33, 34. For a future interactive 3D video application based on the game that is being recorded, the football 30 can be regarded as being the most relevant object. Therefore, at some point prior to recording the match, a criterion can be specified regarding the football 30. For example, the criterion might be "image content contains football". Then, any image captured by one of the cameras and containing the football then satisfies the specified criterion, while an image whose content does not include the football fails to satisfy the specified criterion.

Figure 4A:
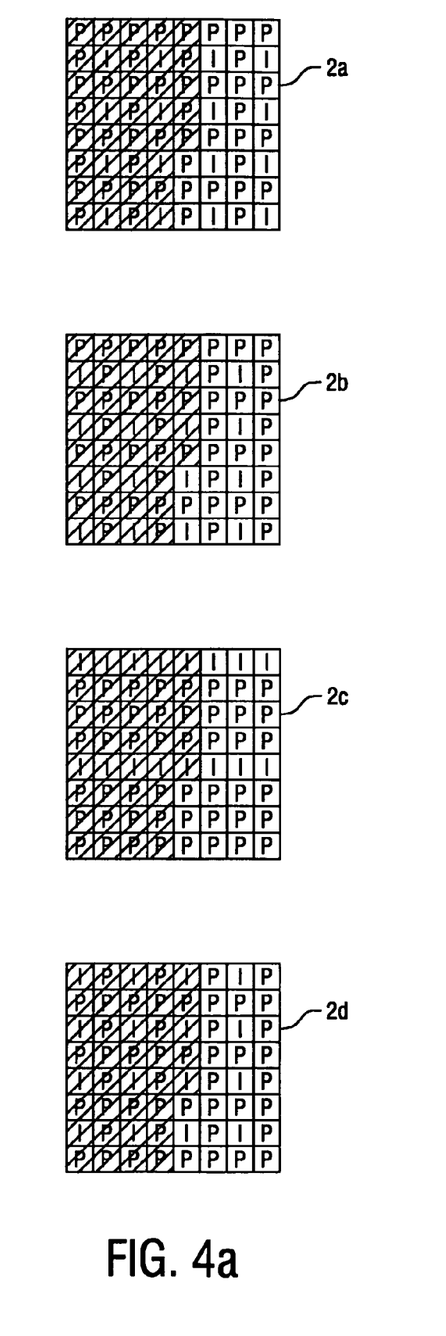
FIG. 4a shows a schematic representation of a number of compression schemes compared to images of a first light-field data structure that satisfy a specified criterion.
Figure 4B:
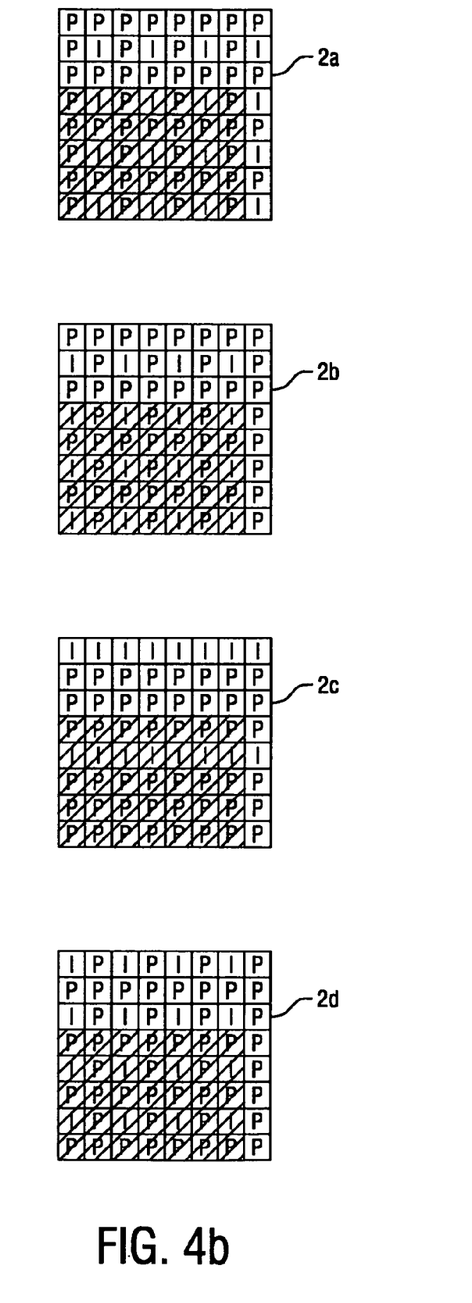
FIG. 4b shows a schematic representation of a number of compression schemes compared to images of a second light-field data structure that satisfy a specified criterion.

The compression scheme for each light-field data structure is then chosen on the basis of the images that satisfy the specified criterion. The way in which a compression scheme is chosen is shown visually in FIG. 4a. Here, four different compression schemes 2a, 2b, 2c, 2d are shown, each of which fulfill the necessary quality requirements (an even distribution of I-images, and a certain number of I-images). The cross-hatched or shaded area overlaid on each compression scheme 2a, 2b, 2c, 2d represents the images of a first light-field data structure that satisfy the specified criterion. In the above example, these are the images taken at a first instant that contain the football. Compression scheme 2a provides eight I-images, compression scheme 2b provides 10 I-images, compression scheme 2c also provides 10 I-images, and compression scheme 2d provides 11 I-images. Since compression scheme 2d offers the most I-images that contain the football, this is the optimal image distribution for this first light-field data structure. The appropriate images are then coded as I-images, and the rest are coded as P-images. FIG. 4b shows the same compression schemes 2a, 2b, 2c, 2d for a second light-field data structure, with images taken at a second instant in time. In this diagram, the shaded area overlaid on each compression scheme 2a, 2b, 2c, 2d represents the images at the later time whose contents satisfy the specified criterion—i.e. that contain the football. For the light-field data structure containing these images, the best image distribution is given by compression scheme 2b, since this compression scheme offers the most I-images containing the football.

Figure 5:
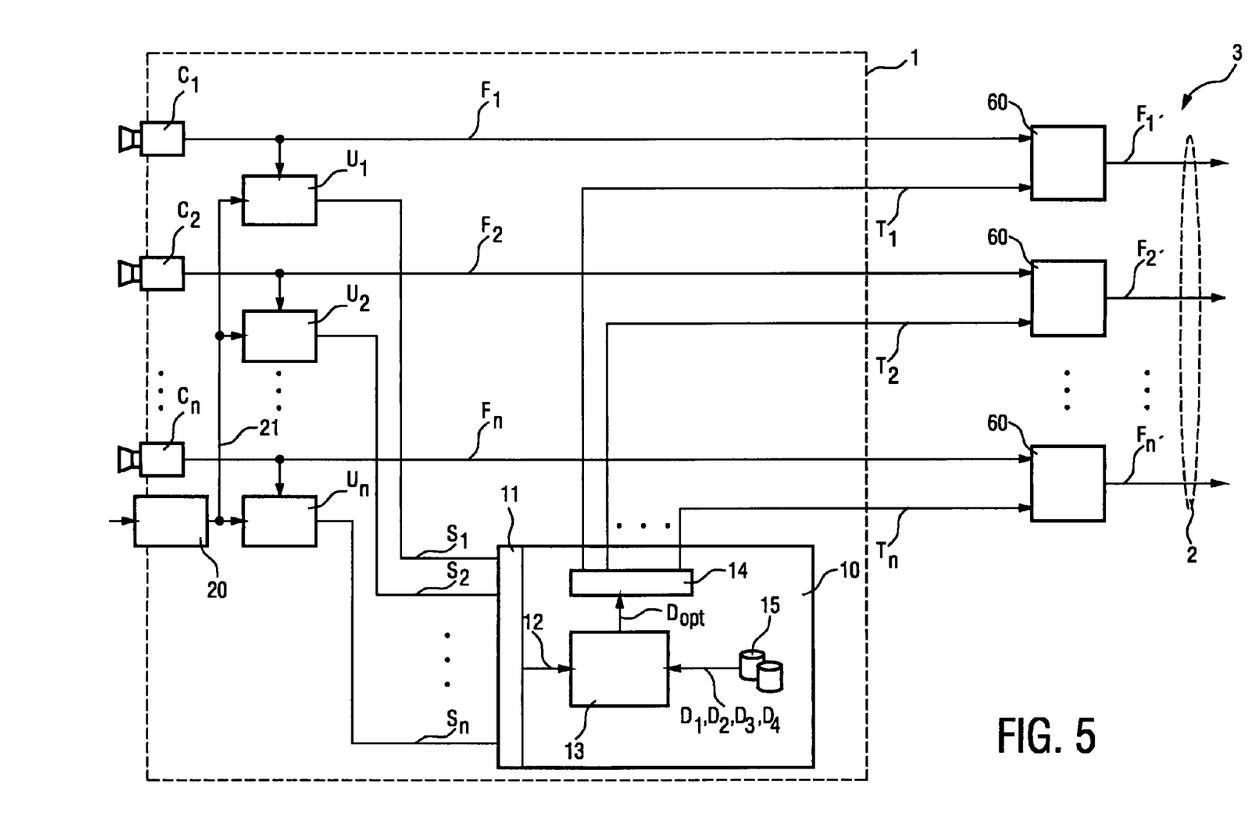
FIG. 5 shows a block diagram of a system for performing video coding according to an embodiment of the invention.

FIG. 5 shows a block diagram of a system 3 for performing video coding using the method according to the invention. Images $F_1, F_2, \ldots, F_n$ captured by an array of cameras $C_1, C_2, \ldots, C_n$ are to be coded to give a light-field data structure 2. The type of coding to be performed—I-image or P-image—is specified for each image $F_1, F_2, \ldots, F_n$ by an image type signal $T_1, T_2, \ldots, T_n$ associated with the image $F_1, F_2, \ldots, F_n$. The image type signals $T_1, T_2, \ldots, T_n$ are generated in a system 1 for determining an optimal image distribution $D_{opt}$ for the light-field data structure. Each image $F_1, F_2, \ldots, F_n$ captured by a camera $C_1, C_2, \ldots, C_n$ is analysed in a following image processing unit $U_1, U_2, \ldots, U_n$, where a segmentation algorithm is run on the image $F_1, F_2, \ldots, F_n$ to determine whether the specified criterion is satisfied or not. The specified criterion is input (for instance during an initialisation step) by means of an interface 20, such as a graphical user interface (GUI), and provided to the $U_1, U_2, \ldots, U_n$ using suitable parameters 21. The image processing units $U_1, U_2, \ldots, U_n$ each deliver an appropriate signal $S_1, S_2, \ldots, S_n$ to an image group identification module 11, which compiles an image group 12 or an array 12 of values indicating the images $F_1, F_2, \ldots, F_n$ whose contents satisfy the specified criterion (using the above example, the images that contain the ball). This image group 12 is compared to a number of predefined reference image distributions $D_1, D_2, \ldots, D_m$ retrieved from a memory 15. The reference image distribution $D_1, D_2, \ldots, D_m$ that offers the most I-images for the current group 12 is selected to be the optimal compression scheme $D_{opt}$ for the current light-field data structure. This optimal reference image distribution $D_{opt}$ is forwarded to an image type designation unit 14, which generates the image type signals $T_1, T_2, \ldots, T_n$ for each image. A simple binary signal can indicate the image type, for instance a logic "1" can indicate "I-image", while a logic "0" indicates "P-image".

Figure 6:
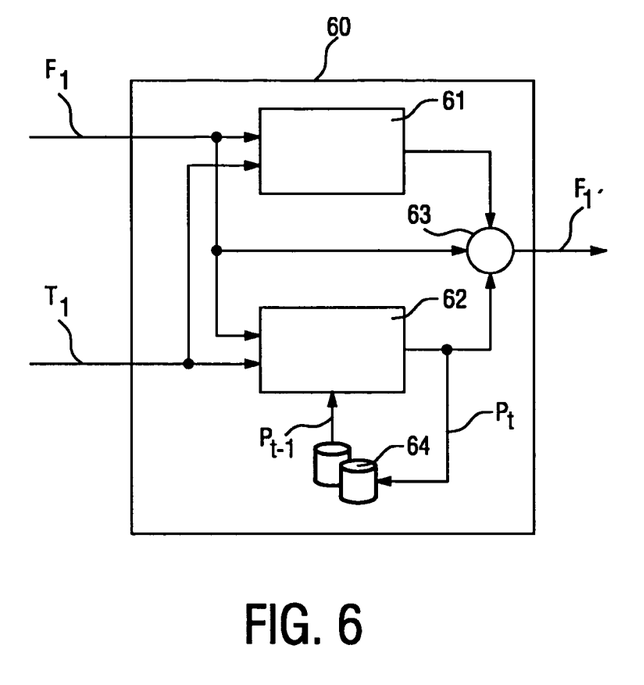
FIG. 6 shows a block diagram of a video coder for coding an image according to its image designation.

Each frame $F_1, F_2, \ldots, F_n$ with its associated image type $T_1, T_2, \ldots, T_n$ are forwarded to video coders 60. One way in which a video coder 60 can be realised is shown as a block diagram in FIG. 6. Here, a video coder 60 is connected to receive the image output $F_1$ of the camera $C_1$ comprises a module 61 for performing I-image coding using only the current frame $F_1$, and a module 62 for performing predictive coding using the current frame $F_1$ as well as one or more previously stored images. As mentioned already, previously coded P-images or I-images can be used to code the present P-image. However, for the sake of simplicity, only one previously coded P-image $P_{t-1}$ is indicated in the diagram. The type of coding—intraframe or interframe—to be performed on the image $F_1$ input to the video coder 60 is specified by the accompanying image type signal $T_1$. If the image $F_1$ has been designated to be an I-frame, then intraframe or I-image coding is to be performed, and this is then carried out by the I-image coding module 61, using, for example, a discrete cosine transform compression algorithm. If the image $F_1$ is designated to be a P-frame, then predictive or P-image coding is to be performed, and this is carried out by the P-image coding module 62, using a previously stored P-image $P_{t-1}$ retrieved from a memory 64. A copy $P_t$ of the current inter-image is stored in the memory 64 for future use (evidently, a copy of the current I-image could be stored for future P-image coding, if this were desired). An output multiplexer 63 chooses the appropriate coder output according to the image type signal $T_1$ and forwards the coded image $F_1'$, as part of an overall light-field data structure, to a following application (not shown in the diagram) to be stored or transmitted, as the situation requires. The set of coded images $F_1', F_2', \ldots, F_n'$ together give the virtual light-field data structure 2 for the current time instant, as indicated by the dashed loop in FIG. 5.

Although the present invention has been disclosed in the form of preferred embodiments and variations thereon, it will be understood that numerous additional modifications and variations could be made thereto without departing from the scope of the invention. For example, the "important object" could be physically marked in some way, for instance by painting it with a substance which is visible in the ultraviolet region of the spectrum, and equipping the cameras with an additional ultraviolet filter. The segmentation algorithm that is used to analyse the images need then only scan the images for the appropriate shape.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A method of determining an image distribution for a light field data structure, which method comprises
    obtaining a plurality of images from a plurality of image sources;
    performing image analysis on each image of the plurality of images to determine whether a specified criterion is satisfied by content of that image;
    identifying a group of images whose contents satisfy the specified criterion;
    comparing the group of images to each reference image distribution of a set of predefined reference image distributions to select an optimal image distribution, wherein a reference image distribution includes a predefined arrangement of I-images and P-images of the light field data structure; and
    designating each image of the plurality of images of the light field data structure to be either an I-image or a P-image according to the selected image distribution.

2. The method according to claim 1, wherein the specified criterion includes parameters related to an object to be detected in content of an image.

3. The method according to claim 1, wherein the step of identifying a group of images includes compiling an image-related array based on the images that satisfy the specified criterion.

4. The method according to claim 1, wherein the optimal image distribution corresponds to the reference image distribution which provides a greatest number of I-images for the image group.

5. The method according to claim 1, wherein the step of performing image analysis includes running a segmentation algorithm on that image.

6. A method of performing video coding of a light field data structure, which method comprises
 determining an optimal image distribution for images of the light field data structure using the method of claim 1;
 coding each image designated to be an I-image using a compression algorithm;
 and coding each image designated to be a P-image using a previously coded image.

7. A system for determining an image distribution for a light field data structure, comprising
 a plurality of image sources for obtaining a plurality of images;
 an image analysis module for performing image analysis on each of the plurality of the plural images to determine whether a specified criterion is satisfied by content of that image;
 an image group identification module for identifying a group of images whose contents satisfy the specified criterion;
 a comparison module for comparing the image group to each reference image distribution of a set of predefined reference image distributions to select an optimal image distribution, wherein a reference image distribution includes a predefined arrangement of I-images and P-images of the light field data structure; and
 an image designation module for designating each of the plural images of the light field data structure to be either an I-image or a P-image based on the selected image distribution.

8. A system for determining an image distribution for a light field data structure according to claim 7, further comprising an interface for specifying a criterion.

9. A non-transitory computer readable medium encoded with data and instructions that when executed by a computer causes a computer to:
 obtain a plurality of images from a plurality of image sources;
 perform image analysis on each image of the plurality of images to determine whether a specified criterion is satisfied by content of that image;
 identify a group of images whose contents satisfy the specified criterion;
 compare the group of images to each reference image distribution of a set of predefined reference image distributions to select an optimal image distribution, wherein a reference image distribution includes a predefined arrangement of I-images and P-images of the light field data structure; and
 designate each image of the plurality of images of the light field data structure to be either an I-image or a P-image according to the selected image distribution.

10. A system for performing video coding, comprising:
 a system for determining an image distribution for a light field data structure comprising:
 a plurality of image sources for obtaining a plurality of images;
 an image analysis module for performing image analysis on each of the plurality of the plural images to determine whether a specified criterion is satisfied by content of that image;
 an image group identification module for identifying a group of images whose contents satisfy the specified criterion;
 a comparison module for comparing the image group to each reference image distribution of a set of predefined reference image distributions to select an optimal image distribution, wherein a reference image distribution includes a predefined arrangement of I-images and P-images of the light field data structure; and
 an image designation module for designating each of the plural images of the light field data structure to be either an I-image or a P-image based on the selected image distribution;
 an I-image coder for coding an image, designated to be an I-image, using a compression algorithm; and
 a P-image coder for coding an image, designated to be a P-image, using a previously coded image.

* * * * *